United States Patent [19]

Shumaker

[11] 4,295,779

[45] Oct. 20, 1981

[54] STRAIGHT ARM LOADER

[75] Inventor: John F. Shumaker, Mt. Pleasant, Iowa

[73] Assignee: J. I. Case Company, Racine, Wis.

[21] Appl. No.: 138,331

[22] Filed: Apr. 8, 1980

[51] Int. Cl.³ .............................................. E02F 3/70
[52] U.S. Cl. ..................................... 414/685; 280/29; 301/36 R; 414/697; 414/722
[58] Field of Search .................. 280/29; 414/685, 697, 414/722, 727, 713; 301/13 R, 135 M, 36 R, 37 H, 87, 90; 295/8.5, 9 A; 180/6.2

[56] References Cited

U.S. PATENT DOCUMENTS

| 3,722,724 | 3/1973 | Blakely | 414/697 X |
| 3,917,352 | 11/1975 | Gageby | 301/63 PW |
| 4,122,960 | 10/1978 | Bauer et al. | 414/697 |
| 4,155,415 | 5/1979 | van der Lely | 301/36 R |

FOREIGN PATENT DOCUMENTS 314244 9/1919 Fed. Rep. of Germany .... 301/13 R

Primary Examiner—Trygve M. Blix
Assistant Examiner—Terrance L. Siemens
Attorney, Agent, or Firm—Dressler, Goldsmith, Shore, Sutker & Milnamow, Ltd.

[57] ABSTRACT

A unique and improved loader design is disclosed incorporating straight lift arms and channeled front wheels. The front wheels define a channel or groove through which the lift arms are allowed to intercept unobstructed. The lift arms pivotally join a bucket positioned at the front of the loader with a pair of uprights positioned at the rear end of the loader. The channeled front wheels may be formed from two ordinary tires joined in tandem and separated by a spacer or by using molded, grooved, elastomeric tires. The design eliminates the highly stressed joint found in ordinary two-piece lift arm loaders. Fabrication is simplified and manufacturing costs are reduced.

7 Claims, 5 Drawing Figures

STRAIGHT ARM LOADER

TECHNICAL FIELD

The present invention relates generally to material handling devices such as a loader. In particular, it is concerned with the lift arms used to manipulate the material handling element.

BACKGROUND OF THE INVENTION

Material handling equipment, such as front end loaders to which the present invention is directed, have been available for a number of years. A typical example of a compact unit of this type is disclosed in U.S. Pat. No. 3,722,724 by Richard P. Blakely and assigned to the assignee of the present invention. To the extent that the above-mentioned patent describes the power train and the operation of the loader, the above-mentioned patent is incorporated herein by reference.

In general, such off-road or material handling machines consist of an elongated body supported by a pair of wheels. The engine compartment is adjacent the rear end of the body and the operator's compartment is adjacent the front end. A pair of stanchions or uprights are fixably secured to the body adjacent the opposite sides of the engine compartment and extend upwardly therefrom. A pair of lift arms are pivotally connected at one end about a common pivot axis on the respective uprights. The arms extend generally downwardly along opposite sides of the body in close proximity to the operator's compartment and terminate at a material handling element at the front of the body and ahead of the front set of wheels. Because the material handling element, usually a bucket, is positioned ahead of the wheels, the lift arms are ordinarily two-piece affairs with a relatively long straight arm extending from the uprights and a relatively short straight arm joined to the free end of the long arm and pointing downwardly towards the front end of the body where it joins the material handling element. The bend in the lift arms allows the lift arms to go over and around the front pair of wheels.

The material handling element is pivoted between a "roll-back" and "dump" positions by a hydraulically operated linkage mechanism that is controlled by the operator seated in the operator's compartment. Pivotal movement of the bucket is accomplished through a fluid ram that has one end pivotally connected to the bucket at a location spaced from the pivotal connection to the free ends of the lift arms and an opposite end connected to the lift arms at a location laterally offset from the longitudinal axis of the downwardly directed short, straight arm. The raising and lowering of the lift arms and the bucket relative to the uprights is normally accomplished through a second pair of fluid rams located between the uprights and the long, straight arm portion of the lift arms.

The loaders just described are characterized in that they are usually supported by four identical wheels or tires with the two tires on each side relatively close to each other. Loaders of this type are relatively small and are normally used in locations where maneuverability and turning space is severely restricted. Consequently, the material handling element must be placed as close as possible to the front end of the machine. Once the position of the material handling element is fixed, the location of the lift arms is determined. These lift arms must of necessity extend beyond the front set of wheels if they are to lift the material handling element from the ground. Conventionally, this has been accomplished by the two-piece lift arm structure previously described. Because of this angular arrangement between the short, straight arm and the long, straight arm portion of the lift arm, the joint between the two arms is relatively high stressed. It would be desirable from a fabrication and strength of materials standpoint to form each lift arm from a single piece of structural steel.

While it would be possible to have a straight line, single piece lift arm structure passing outboard or inboard the front set of wheels, this has not been adapted in commercial designs for several reasons. All other factors remaining the same, if the lift arms were placed outboard of the front set of wheels, the overall width of the machine would of necessity be increased. Similarly, if the lift arms were placed inboard the front set of wheels, either the size operator's compartment would have to be reduced or the front set of wheels placed further outboard to make room for the lift arms. In each case, the overall wheel base or effective width of the machine is increased. Any increase in width affects the maneuverability and turning radius of the machine. Consequently, it has been industry practice to use a two-piece or bent lift arms. Industry has expressed a long felt but unsatisfied need for a loader having one piece straight lift arms yet having the same maneuverability as a loader having the piece lift arms.

SUMMARY OF THE INVENTION

The present invention is for an improved loader having straight lift arms. Specifically, the loader features one-piece, straight lift arms and split, tandem or channeled front tires or wheels. In addition the loader has an elongated body portion with an engine compartment adjacent the rear end thereof, and an operator's compartment adjacent the forward end thereof. A pair of uprights extend above the body on opposite sides of the engine compartment. A pair of single-piece, straight, lift arms are pivotally connected at one end of the uprights at a location spaced above the main body and extending past the operator's compartment downwardly and adjacent the front end of the machine. A material handling element, such as a bucket, is pivoted at the free ends of the lift arms and is moved through a hydraulic linkage system between raised and lowered positions. The lift arms are adapted to be raised and lowered along opposite sides of the operator's compartment by a pair of fluid rams having opposite ends connected to the respective uprights and lift arms. The front set of wheels are arranged in tandem or are of a split or grooved construction to enable the downwardly projecting ends of the lift arms to be joined to the material handling element without having a bend or joint in the lift arms.

Thus, it is possible to keep the material handling element close to the front end of the machine while at the same time incorporating a single-piece, straight lift arm structure and, without changing the overall wheel base or the maneuvering characteristics of the machine. In addition, the straight, one-piece lift arm structure is easier to fabricate than conventional designs and eliminates the highly stressed joint found in ordinary two-piece lift arms.

Numerous other advantages and features of the present invention will become readily apparent from the following detailed description of the invention and the embodiments illustrated therein, from the claims, and from the accompanying drawings.

DETAILED DESCRIPTION

Figure 1:
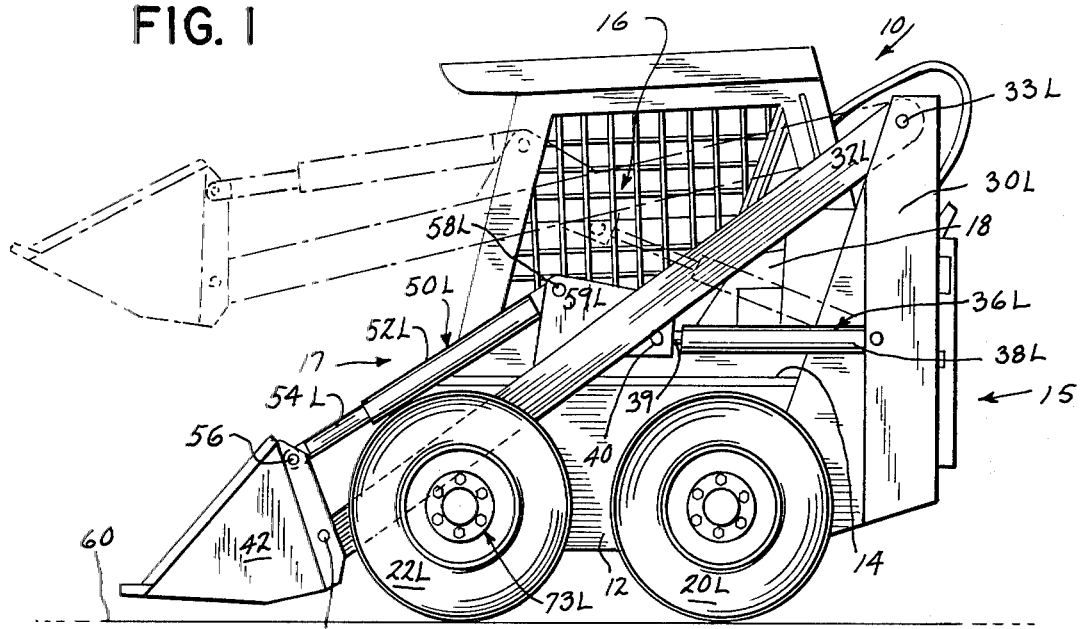
FIG. 1 is a side elevational view of a loader incorporating the lift arm design and front wheel structure that are the subject of the present invention.

While this invention is susceptible of embodiment in many different forms, there is shown in the drawings and will herein be described in detail two specific embodiments, with the understanding that the present disclosure is to be considered as an exemplification of the principles of the invention and is not intended to limit the invention to the specific embodiments illustrated.

FIG. 1 of the drawings generally discloses a material handling machine or loader 10 consisting of an elongated body 12 having an engine compartment 14 adjacent the rear end 15 thereof and enclosed operator's compartment 16 adjacent the forward end 17 thereof with a seat 18 located in the operator's compartment 16 between the two sides 19R, 19L (See FIG. 2) of the elongated body 12. The body 12 is supported by ground-engaging means consisting of two sets of wheels, a rear set 20R, 20L and a front set 22R, 22L. The specific arrangement of the wheels is most clearly illustrated in FIGS. 2 and 3, which will be explained in short order.

Since many of the remaining elements to be described are duplicated on opposite sides of the main body 12, only one set of elements will be described in detail with the understanding that the description will likewise refer to an identical set of elements located on the opposite side of the engine compartment 14 and operator's compartment 16. Identical elements on each side are identified with a capital letter "R" suffix for the right side and a capital letter "L" suffix for the left side of the loader relative to the right and left hands of the driver sitting in the operator's compartment 16. Exceptions to this general rule will be made for the purposes of clarity when a specific feature must be discussed.

Disregarding the details of front set of wheels 22 for the present, the material handling machine 10 will now be described in detail. A pair of transversely spaced stanchions or uprights 30 extend upwardly along opposite sides of the rear end 15 of engine compartment 14 and terminate above the body 12 at a location spaced above the operator's seat 18. A lift arm 32 is pivotally connected at one end by a pivot pin 33 to the upper end of each of the uprights 30. The two pivot pins 33R, 33L for the respective lift arms 34R, 34L are located upon a common horizontal axis 35. The lift arm 32 are formed from an elongated, substantially straight, box beam 32L (See FIGS. 3A and 3B) that extends downwardly to the front end 17 of the elongated body 12.

Each of the lift arms 32 is adapted to be raised and lowered relative to the body 12 by a fluid ram 36. The fluid ram 36 includes a cylinder 38 (pivoted to an upright 30 adjacent its lower end) and a piston rod 39 (connected to a pair of ears 40 joined to the lift arms 32). Extension and retraction of the piston rods 39 will move the lift arms 32 between raised and lowered positions, respectively shown in dotted and solid lines in the FIG. 1.

A material handling element 42, such as a bucket or a lift fork, is pivotally connected to the opposite end of the lift arms 32 by pivot pins 46. The material handling element 42 is adapted to be raised and lowered relative to the lift arms 32 by a fluid ram 50. The piston rod portion 54 of the fluid ram 50 is joined to the material handling element 42 by a pivot pin 56. The cylinder portion 52 of the fluid ram 50 is joined to a set of ears 59 on the lift arm 32 by a pivot pin 58. Extension and retraction of the piston rods 54 will pivot the material handling element 42 relative to the lift arms 32. In particular, when the piston rods 54 are extended, the material handling unit 42 will be pivoted counterclockwise to a dumping position.

As can be appreciated from the foregoing description, the material handling element 42 must be positioned as close as possible to the ground or grade 60 upon which loader 10 travels if the unit is to function properly. Similarly, the wheel base or the effective area occupied by the entire machine (best shown in FIG. 2) should be as small as possible if the loader 10 is to be maneuverable. If the material handling element 42 is to be kept as low as possible relative to the grade 60, and if the machine is to be maneuverable in tight quarters, the provision must be made to eliminate any interference between front wheels 22 and lift arms 32.

Figure 2:
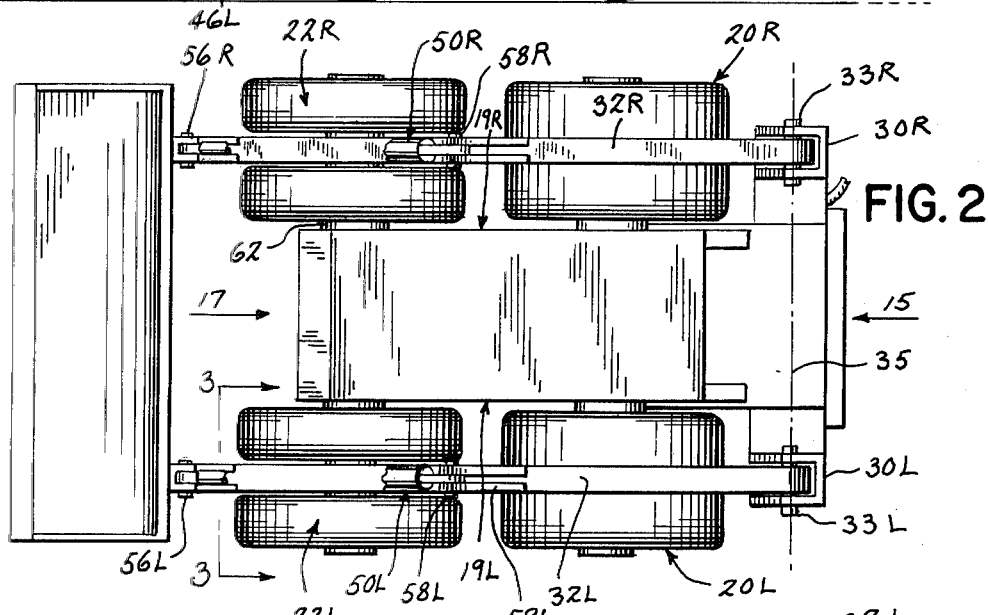
FIG. 2 is a top plan view of the loader shown in FIG. 1.

In the present invention, these two design requirements are satisfied in a rather unique and non-obvious fashion. Referring to FIGS. 1 and 2, it will be observed that the front set of wheels 22 are "split" to allow the lift arms 32 to pass as close as possible to the axis of the front wheels 22. In other words by splitting or channeling each front wheel 22L, 22R, the lift arms 32 define the shortest (a straight line) distance between a give position on the uprights 30 and the forwardly disposed material handling element 42 when that element is in the lowered or ground-engaging position.

Two embodiments of the front wheels 22 (illustrated in FIGS. 3A and 3B) are offered to describe the manner in which the lift arms 32 can be brought as close as possible to the axis of the front wheels 22 and the lowered material handling element without affecting the maneuvering characteristics of the vehicle or otherwise enlarging or modifying the basic structure of the machine.

Figures 3A, 3B, 3C:
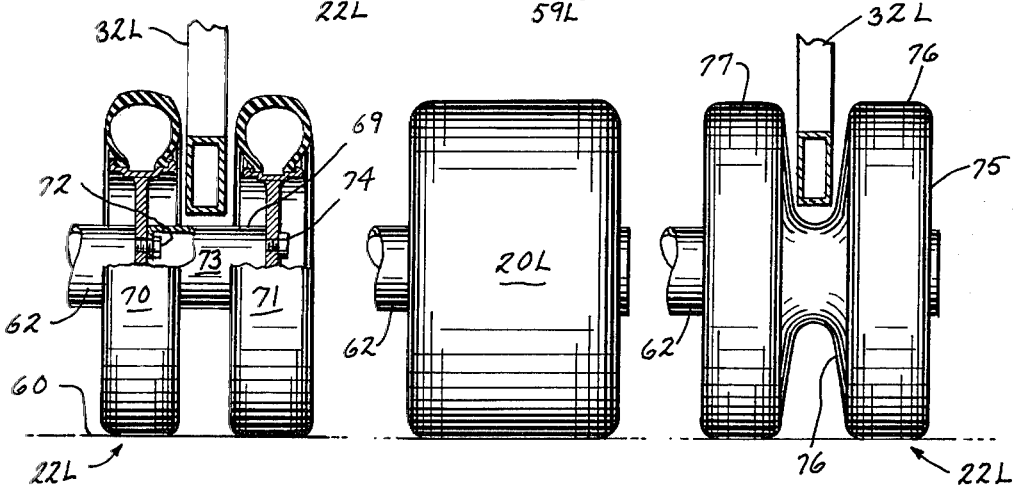
FIG. 3A is a profile view of the left front wheel shown in FIG. 1 (as viewed along line 3—3 of FIG. 2) that illustrates one embodiment of the invention.
FIG. 3B is a profile view of the left front wheel of the loader shown in FIG. 1 (as viewed along line 3—3 of FIG. 2) that illustrates the second embodiment of the invention.
FIG. 3C is a profile view of the left rear wheel shown in FIG. 1.

Referring to the figures, FIG. 3C illustrates the profile of the rear wheels 20 or the profile of the front wheels in an ordinary loader 10 not having substantially straight lift arms 32. In FIG. 3A, the front wheel axle 62 has been modified to accept two separate wheels 70, 71 are joined together in tandem by a spacer 73. Such a spacer would be attached to the mounting studs 72 on the inner wheel 70. The outer wheel 71 is mounted on the studs 74 (see FIG. 1) projecting from the free end 69 of the spacer 73. The spacer 73 is sufficiently wide to permit the associated lift arm 32R to pass in between the two wheels 70, 71 without interference. Each wheel 70, 71 is less than one-half the width of the corresponding rear wheel 20L or less than one-half the width of the front wheel (see FIG. 3C) of a loader not having substantially straight, one-piece lift arms 32.

FIG. 3B illustrates an embodiment wherein a single wheel or tire 75 is positioned at each end of the front axle 62. Here, however, the front wheel or tire 75 is cast or molded in one piece with a central circumferential channel 76. One manufacturer, Bayer AG, has developed a new process called "desmocast"[1] to produce a highly wear-resistant, long-lasting, plastic tractor tire. Other processes and methods may be used to form a tire or wheel 75 similar to that shown in FIG. 3B; other profiles may be employed. Regardless of the specific process, the front wheels 22 would be cast in the shape to permit the lift arm 34 to pass through without interference.

[1] Plastics World, November 1979, "What in the World is new?", page 46.

Whatever specific shape or profile selected, the one piece tire 75 is characterized by a circumferential slot or channel 76 positioned between two raised or ground-engaging surfaces 76, 77 of the tire 75. Thus, either by joining two conventional tires in tandem with a spacer 73 (as shown in FIG. 3A) or by utilizing a specially formed, one-piece tire 75 (as shown in FIG. 3B), the loader 10 can be constructed to incorporate straight lift arms 32 and high maneuverability.

In summary, the unique and highly novel non-obvious concept of channeling the front wheels 22 of a loader 10 achieves several advantages:

1. A single-piece, straight lift arm can be used without affecting loader maneuverability;

2. The fabrication process is simplified in that the highly stressed joint often found in loaders having a two-piece lift arms is eliminated;

3. For a given engine compartment or frame design, the lift capacity of the material handling element can be increased without adding weight to the lift arms or increasing the cross-sectional area of the lift arms.

4. Fabrication and design costs are reduced.

Thus, it is apparent that there has been provided in accordance with the invention, a unique, novel loader design featuring a straight, one piece lift arm that has a lower residual stress concentration and that is easier and less expensive to fabricate and a highly novel front wheel arrangement that allows the straight, one-piece lift arm to be used without affecting the maneuverability of the machine. While the invention has been described in conjunction with two specific embodiments, it is evident that many alternatives, modifications, and variations will be apparent to those skilled in the art in light of the foregoing description. Accordingly, it is intended to cover all such alternatives, modifications, and variations as set forth within the spirit and broad scope of the appended claims.

What is claimed is as follows:

1. A loader comprising: a frame having a rearwardly disposed support member; a material handling element disposed adjacent the front end of said frame; a pair of substantially straight lift arms disposed on opposite sides of said frame, each lift arm is pivotally joined at one end to said support member and at the opposite end to said material handling element; means, interconnecting said frame and at least one lift arm, for moving said lift arms between a raised and a lowered position; and wheel means for movably supporting said frame relative to the ground, said wheel means defining two channels at the front end of said frame adapted to receive said lift arms in their lowered position.

2. The loader defined in claim 1, wherein said wheel means includes a pair of coaxially mounted wheels positioned to one side of the front end of said frame, said wheels being axially spaced apart from each other a distance at least as great as the transverse dimension of said lift arm whereby said spaced apart wheels define one of said two channels.

3. The loader defined in claim 1, wherein said wheel means includes at least one wheel defining two concentric ground-engaging surfaces joined by a circumferential groove, a portion of said lift arm freely fitting within said groove, whereby said groove defines one of said channels.

4. A loader, comprising:
   (a) a frame movably supported above the ground at one end by at least one wheel;
   (b) a material handling element positioned disposed at the opposite end of said frame as said at least one wheel;
   (c) a pair of substantially straight lift arms pivotally joined at one end to said one end of said frame and at the opposite end to said material handling element;
   (d) means, pivotally joined at one end to said frame and joined at the opposite end to one of said lift arms, for raising and lowering said lift arms relative to the ground, said material handling element in the lowered position resting on the ground; and
   (e) wheel means, adjacent said material handling element, for movably supporting said frame above the ground, said wheel means defining a circumferential channel that is adapted to receive without interference a portion of said lift arms, whereby for any position of said one end of said lift arm with said material handling element resting on the ground, each of said lift arms defines the shortest straight line distance between the pivot axis of said lift arms on said frame and the pivot axis of said lift arms on said material handling element.

5. The material handling machine defined in claim 1 or 4, wherein said wheel means includes two ground-engaging members each positioned to either side of the longitudinal axis of said frame and behind said material handling element.

6. The material handling machine defined in claim 5, wherein said wheel means includes at least one molded elastomeric tire, said tire defining two ground engaging circumferential surfaces and an integral circumferential channel bridging the gap between said surfaces, a portion of one of said lift arms freely fitting within said circumferential channel.

7. The material handling machine defined in claim 1 or 4, wherein said straight lift arms are one-piece lift arms.

* * * * *